Sept. 3, 1968  P. A. G. LEPELLETIER  3,399,748
VOLUME CONTROLLING MEANS FOR HYDRAULIC BRAKES
Filed Feb. 18, 1966  5 Sheets-Sheet 1

INVENTOR
PIERRE ANDRE GEORGES LEPELLETIER
BY Irving S. Thompson
ATTY.

Sept. 3, 1968 P. A. G. LEPELLETIER 3,399,748
VOLUME CONTROLLING MEANS FOR HYDRAULIC BRAKES
Filed Feb. 18, 1966 5 Sheets-Sheet 2

INVENTOR
PIERRE ANDRE GEORGES LEPELLETIER
By Irwin S. Thompson
ATTY.

Sept. 3, 1968  P. A. G. LEPELLETIER  3,399,748
VOLUME CONTROLLING MEANS FOR HYDRAULIC BRAKES
Filed Feb. 18, 1966  5 Sheets-Sheet 3

INVENTOR
PIERRE ANDRE GEORGES LEPELLETIER
BY Irwin J. Thompson
ATTY.

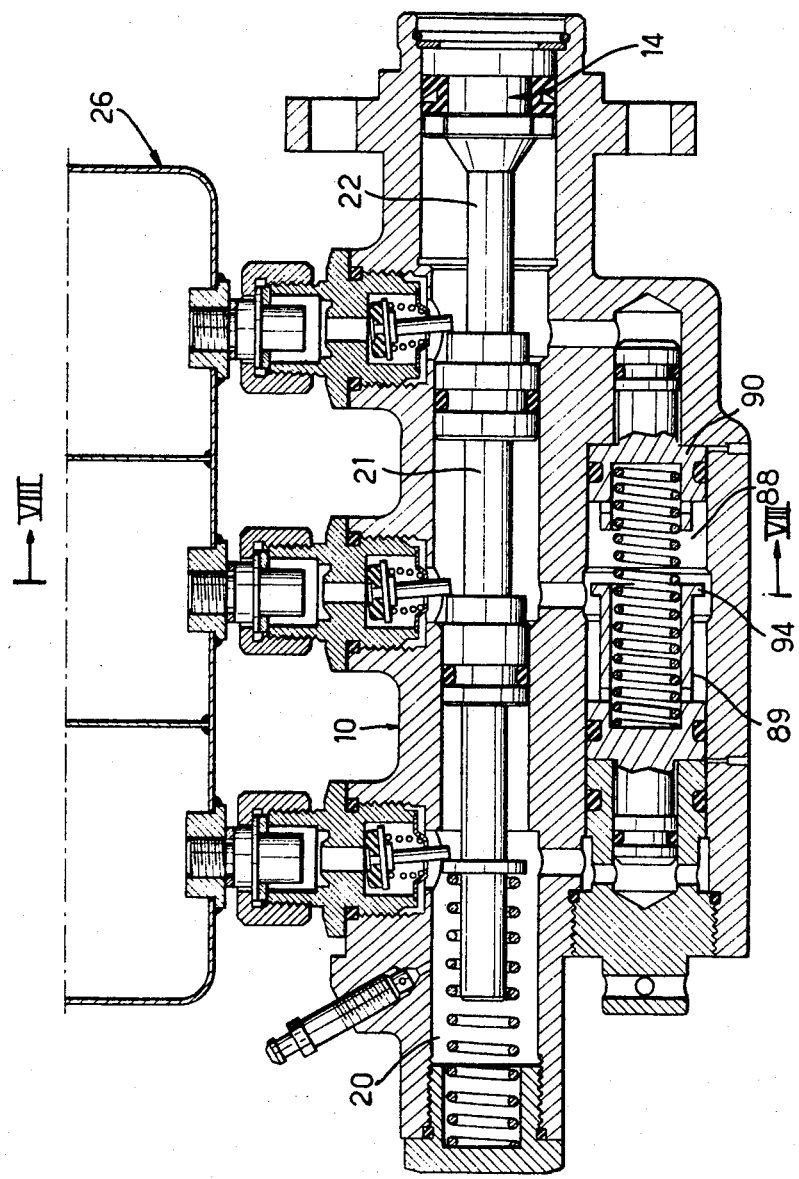

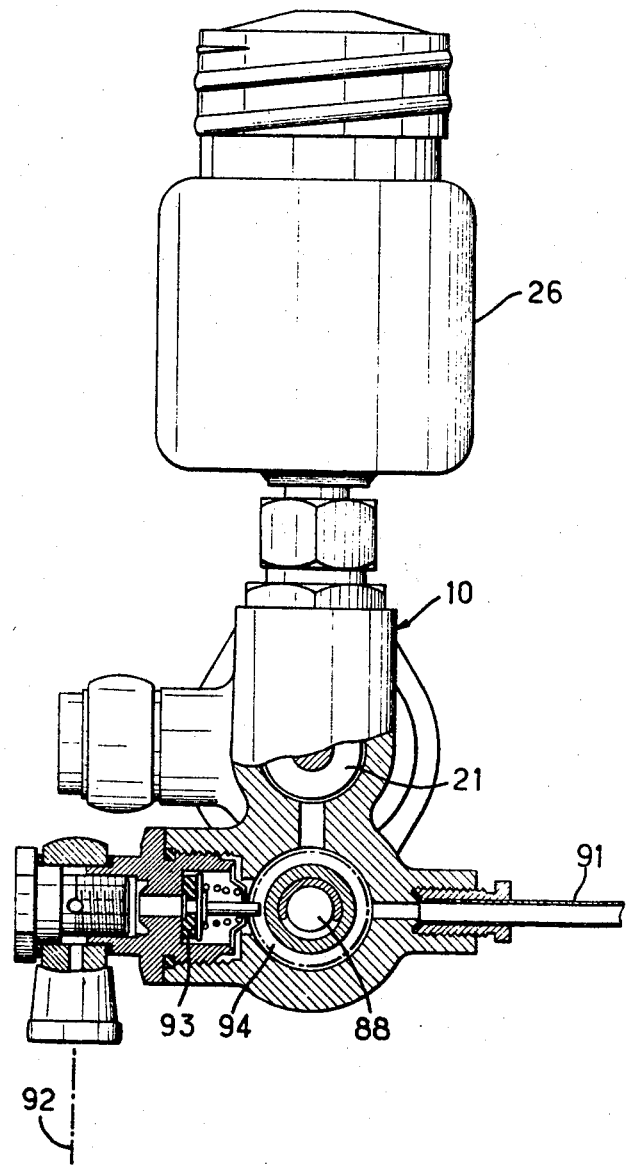

United States Patent Office 3,399,748
Patented Sept. 3, 1968

3,399,748
VOLUME CONTROLLING MEANS FOR
HYDRAULIC BRAKES
Pierre André Georges Lepelletier, Chatou, Yvelines,
France, assignor to Societe Anonyme Francaise du
Ferodo, a corporation of France
Filed Feb. 18, 1966, Ser. No. 528,461
Claims priority, application France, Mar. 2, 1965,
7,551
6 Claims. (Cl. 188—152)

ABSTRACT OF THE DISCLOSURE

In a brake system for an automotive vehicle having brakes on two axles, the brake on one axle is provided with a primary and a secondary chamber and the brake on the other axle is connected to the secondary chamber of the first brake. Reinforcement means are provided for augmenting the volume and/or pressure of the fluid to the second brake during the course of braking upon reverse movement, that is, movement in the direction in which the pressure in the secondary chamber tends to be lowered. The reinforcement means can be a device for limiting the expansion of the secondary chamber, either mechanically or by cutting off the supply of fluid to the secondary chamber, and/or it can be a pressure booster in the secondary circuit.

---

The present invention relates to hydraulic brakes, especially for automotive vehicles, and more particularly to braking installations in which each of the two brakes of a first axle has a double supply and comprises a primary chamber defined at least in part by a primary piston, and a secondary chamber defined at least in part by a secondary piston, the said primary and secondary pistons being associated with the brake-application members, a master-cylinder driving equivalent volumes of fluid, for example equal or proportional volumes, into the primary chambers of the brakes of the said first axle, while the secondary chambers of the brakes of the said first axle are coupled to a secondary circuit which communicates on the one hand with a transfer chamber of the master cylinder, and on the other hand with the two brakes of a second axle so as to apply the said brakes.

The transfer chamber of the master cylinder is preferably provided so that it reduces in volume during the operation of the master cylinder.

The first axle may, for example, be a front axle of the vehicle and the second axle a rear axle. In the text which follows, the brakes of the first axle are described as front brakes and the brakes of the second axle as rear brakes.

In a braking installation of the kind indicated above, the performance is excellent during the course of braking on forward running, both as regards the effectiveness and the stability and balancing, but it may happen that the power of the rear brakes is relatively small during the course of braking in reverse running, especially when the transfer chamber of the master cylinder is of small capacity.

The present invention has for its object improvements in hydraulic brakes, especially for automotive vehicles, which enable, in braking installations of the kind referred to and especially when the transfer chamber of the master cylinder is of small capacity, the braking performances on reverse running and more particularly the performance of the rear brakes during the course of braking on reverse running to be increased.

The improvements according to the invention comprise various means, amongst others, of which some improve the volume conditions of the fluid driven into the rear brakes during the course of braking on reverse running while the others improve the pressure conditions of the fluid driven into the rear brakes during the course of braking on reverse running, and these various means may, within the scope of the invention, be adopted either separately, wholly or in part, or in combination, either volume means with volume means or pressure means with pressure means, or again volume means with pressure means.

According to one of the improvements of the invention, which concerns means for improvement of volume abutment means co-operate with the secondary piston of each front brake and act so as to limit the movements of the secondary piston in the direction which produces an increase of volume of the secondary chamber.

By virtue of this arrangement, during reverse running, as the secondary piston cannot pass out, there is no intake of oil to the secondary circuit. The front brakes act with a self-releasing action and are therefore of low power, but they do not absorb secondary oil, and all this oil passes to the rear, where the cylinders are sufficiently small for the braking to be effective.

In one form of construction, the abutment means are constituted by a shoulder of the wheel cylinder and cooperate with a collar fixed on a tail of the secondary piston, while in an alternative form the abutment means are formed by a washer fixed in the wheel cylinder and co-operating with the extremity of the secondary piston.

In certain cases, it may be advantageous for the primary piston of each front brake to be provided with a tail subjected to the secondary pressure. In the event of failure of the primary circuit, this enables a certain braking effect to be retained by the complementary action of the secondary pressure on the primary piston.

According to a further improvement of the invention, a separation ring is interposed between the primary chamber and the secondary chamber of the wheel cylinder of each front brake and surrounds a tail of the secondary piston by being engaged in the primary bore, while a collar on the said ring is engaged in the secondary bore, fluid-tight seals being provided, not only between the ring and the tail of the secondary piston and between the ring and the primary bore, but also between the collar of the ring and the secondary bore.

By virtue of this arrangement, during braking on reverse running, the movement of the separation ring in the secondary bore due to the effect of the primary pressure, which is then preponderant, compensates for the lack of oil due to the outward movement of the secondary piston. The volume available for the oil during reverse running is the same as the volume available for the oil on forward running, and the relative positions of the primary and secondary pistons and of the separation ring remain unchanged. The available oil passes to the rear, where the cylinders are sufficiently small for the braking to be effective.

A subcombination of the invention comprises a wheel cylinder having two bores in alignment which receive respectively two pistons associated with the brake-application members, in which a sliding separation ring is engaged in one of the bores and has a collar engaged in the other bore, fluid-tight means being provided both between the first bore and the ring and between the second bore and the said collar.

In an alternative form, the two bores form a single bore of the same diameter, the ring being provided with fluid-sealing means with the said bore and being fitted with an abutment means.

According to a further improvement of the invention, which concerns means for improving the pressure, a pressure booster is interposed in the secondary circuit between the transfer chamber of the master cylinder and, on the one hand, the secondary chambers of the front brakes and on the other hand the chambers of the rear brakes. The pressure booster may be independent of the master cylinder or it may be incorporated therewith.

According to another improvement of the invention, the transfer chamber of the master cylinder is directly connected to the chambers of the rear brakes and is coupled to the secondary chambers of the front brakes by means of a unidirectional clapper valve co-operating with or constituted wholly or partly by a member responsive to one or more appropriate factors, for example the direction of running during braking. This member is for example responsive to a comparison of the secondary pressure with one or the other or both of the primary pressures. The said member may for example co-operate for that purpose with a plunger subjected on one side to the secondary pressure and on the other side to one of the primary pressures.

The objects, characteristics and advantages of the invention will be further brought out in the description which follows of forms of embodiment chosen by way of example, reference being made to the accompanying drawings, in which:

FIG. 7 is a view in longitudinal section of an alternative form of master cylinder;

FIG. 8 shows the master cylinder of FIG. 7 with parts broken away in section taken along the line VIII—VIII of FIG. 7.

Figure 1:
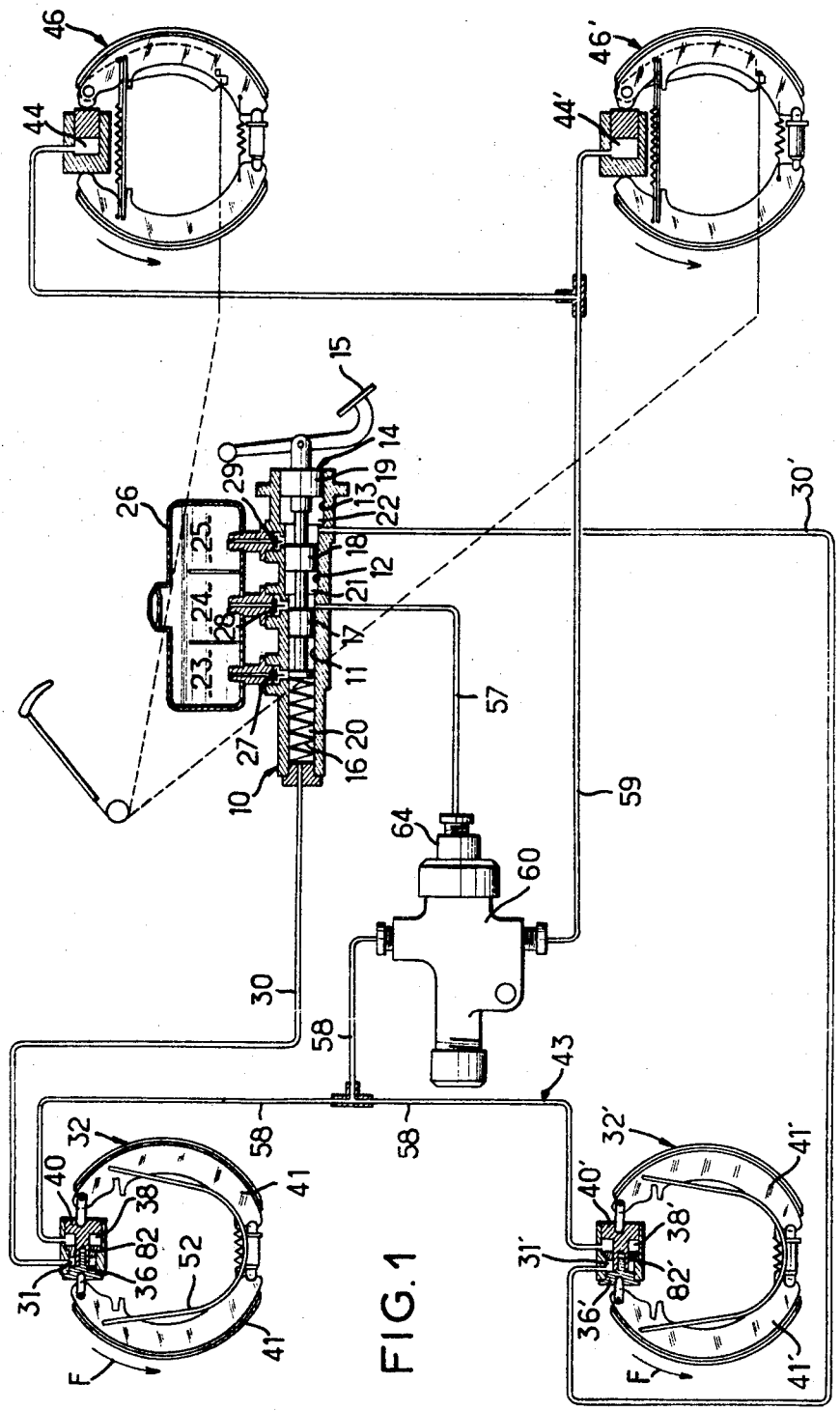
FIG. 1 is a general diagrammatic view of a braking installation for an automotive vehicle in accordance with the invention.
Figure 2:
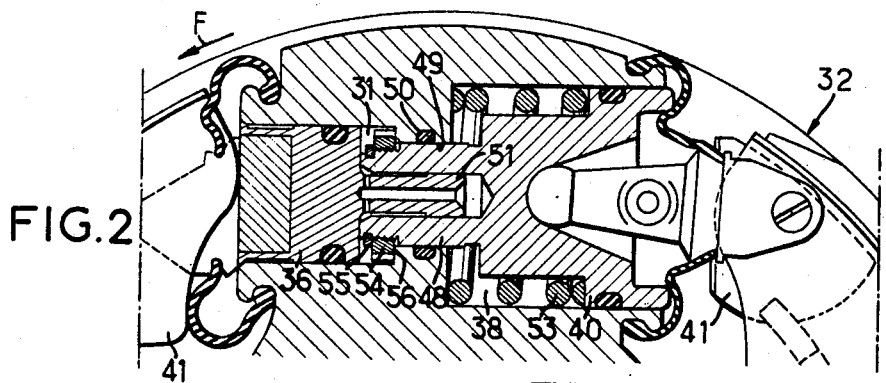
FIG. 2 is a view in cross-section to a larger scale of a front wheel cylinder.
Figure 3:
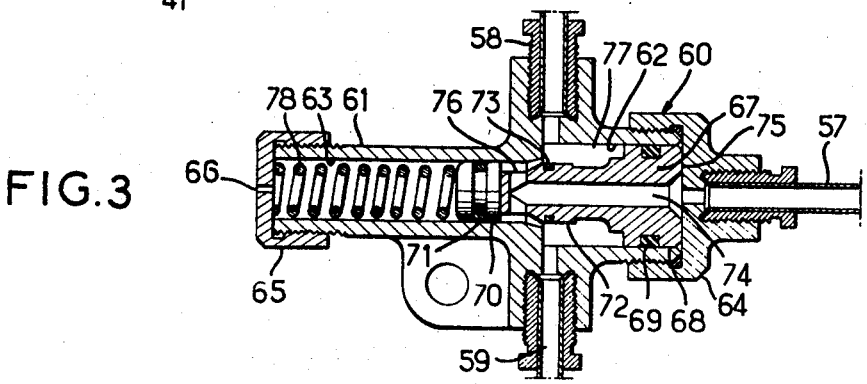
FIG. 3 is a view in cross-section of the pressure booster of the installation of FIG. 1.

Reference will first be made to FIGS. 1 to 3 which are concerned with an application of the invention to a braking installation for an automotive vehicle. In FIG. 1, there can be seen at 10 the master cylinder which comprises three stepped bores 11, 12, 13, and a master piston 14 which is actuated by the brake pedal 15 and brought back to rest by a restoring spring 16. The master piston 14 comprises three pistons 17, 18, 19, engaged respectively in the bores 11, 12 and 13. In front of the piston 17 is formed a first primary thrust chamber 20. Between the pistons 17 and 18 is formed a secondary transfer chamber 21 and between the pistons 18 and 19 is formed a second primary thrust chamber 22. The chambers 20, 21 and 22 are respectively connected to three compartments 23, 24 and 25 of a tank 26 through the intermediary of clapper valves 27, 28 and 29 which are tilted by the master piston 14. Each of the valves 27, 28 and 29 is partly open when the pedal 15 is at rest and is closed when the master piston begins to move inwards under the action of the pedal 15.

The first thrust chamber 20 is connected by a conduit 30 to a so-called primary chamber 31 of the right-hand front brake 32, while the second thrust chamber 22 is connected by a conduit 30′ to a so-called primary chamber 31′ of the left-hand front brake 32′. The arrangement is such that the master cylinder 10 drives equivalent, equal or proportional volumes (equal in the example shown) into the primary chambers 31 and 31′ of the front brakes 32 and 32′.

The right-hand front brakes 32 has a double supply and comprises, in addition to the primary chamber 31 defined at least in part by a primary piston 36, a secondary chamber 38 defined at least in part by a secondary piston 40.

Similarly, the left-hand front brake 32′ has a double supply and comprises, in addition to the primary chamber 31′ defined at least in part by a primary piston 36′, a secondary chamber 38′ defined at least in part by a secondary piston 40′.

The primary piston 36 and secondary piston 40 of the right-hand front brake 32 are associated with the application members 41 of the said brake 32, so that the braking reaction causes a higher pressure in the secondary chamber 38 than in the primary chamber 31 during forward running (arrow F of FIG. 1), and a lower pressure in the secondary chamber 38 than in the primary chamber 31 during reverse running (direction opposite to that of the arrow F).

The same is true for the left-hand front brake 32′, the application members of which are indicated at 41′.

The secondary chambers 38 and 38′ of the front brakes 32 and 32′ are connected to a secondary circuit which is indicated as a whole by the reference 43. The secondary circuit 43 communicates on the one hand with the transfer chamber 21 of the master cylinder 10, and on the other hand with the cylinders 44 and 44′ of the right-hand rear brake 46 and left-hand rear brake 46′ for the application of the said rear brakes.

Each of the front brakes 32 and 32′ may be of the type in which the application members 41 and 41′ are shoes co-operating with drums. Reference will be made more particularly to FIG. 2, in which is shown in a more detailed manner, a front wheel cylinder, for example the cylinder of the front right-hand brake 32. The secondary piston 40 is provided with a tail 48 capable of passing into the primary chamber 31. The tail 48 slides in a bore 49 comprised between the bores of the chambers 31 and 38 and smaller than each of these bores. A sealing ring 50, embedded in the bore 49, ensures fluid-tightness between the chambers 31 and 38. The piston 36 comprises a tail 51 which engages in a bore in the tail 48. The two shoes 41 are subjected to the action of a restoring spring 52 (FIG. 1) while the secondary piston 40 co-operates with a centering spring 53 (see FIG. 2).

The extremity of the extension 48 of the secondary piston 40 in the primary bore 31 (FIG. 2) is threaded and receives a nut 54, while a keeper ring 55 serves to lock the nut. The nut 54 co-operates with an abutment shoulder 56 so as to permit the movement of the secondary piston 40 from the right to the left in FIG. 2, but to prevent any movement of this piston from the left to the right beyond the abutment 56.

The secondary circuit 43 (FIG. 1) is composed of three piping systems 57, 58 and 59. The pipe 57 is connected to the transfer chamber 21; the pipe 58 is connected to the secondary chambers 38 and 38′ of the front brakes 32 and 32′, and the pipe 59 is connected to the cylinders 44 and 44′ of the rear brakes 46 and 46′. The three pipes 57, 58 and 59 are connected to a pressure booster 60.

The pressure booster 60 (see FIG. 3) comprises a body 61 having a first bore 62 and a second bore 63. This latter is in line with the bore 62 and has a smaller diameter. On the extremity of the bore 62 is screwed a plug 64 to which is coupled the conduit 57. On the extremity of the bore 63 is screwed a plug 65 which is provided with a small orifice 66 which puts the bore 63 in communication with the atmosphere.

A piston 67 comprises: a first bearing surface 68 provided with a sealing ring 69, permanently engaged in the bore 62, a second bearing surface 70 provided with a sealing ring 71, permanently engaged in the bore 63; and a third bearing surface 72 which is comprised between the surfaces 68 and 70 and is provided with a sealing ring 73.

The bearing surface 72 has the same diameter as the surface 70 and, depending on the position of the piston 67, extends into the first bore 62 (the case of FIG. 3) or alternatively passes into the second bore 63, its sealing ring 73 then co-operating with the said bore 63. A passage 74 is formed in the piston 67 and extends between the extremity 75 of the piston 67 and one or more openings 76 formed between the bearing surfaces 70 and 72.

An intermediate chamber 77 is formed in the bore 62 and is defined between the bearing surface 68 on the one hand and either the bearing surface 70 or the surface 72 on the other, depending on whether the bearing surface 72 is or is not engaged in the bore 63; the chamber 77 communicates with the piping systems 58 and 59. A helicoidal spring 78 extends into the bore 63 and is applied between the plug 65 and the extremity of the piston 67.

The transfer chamber 21 of the master cylinder 10 is adapted to be reduced in volume when the pedal 15 is depressed, so that during braking, oil is expelled into the conduit 57.

As long as the pressure in the conduit 57 remains insufficient to overcome the spring 78, the piston 67 remains in the position shown in FIG. 3, in which the passage 74 causes the conduit 57 to communicate with the chamber 77, that is to say with the conduits 58 and 59. Under these conditions, the same pressure exists in the conduits 57, 58 and 59.

Starting from a predetermined threshold value of the pressure in the conduit 57, the piston 67 moves towards the left of FIG. 3, which engages the surface 72 in the bore 63. The communication between the conduit 57 and the chamber 77 is closed by the action of the sealing ring 73. The pressure in the conduits 58 and 59 is from then on greater than the pressure in the conduit 57, and the device 60 acts as a pressure booster.

During the course of braking on forward running, the volumes of oil driven through the conduits 30 annd 30' into the primary chambers 31 and 31' of the front brakes 32 and 32' cause an expansion of the primary pistons 36 and 36' which bring the shoes 41 and 41' into contact with their respective drums. The secondary pistons 40 and 40' move in towards the primary chambers 31 and 31'. There is therefore in each front brake an expansion movement of the shoes and a movement of the moving system in the direction of the arrow F.

The braking reaction produces a high pressure in the secondary chambers 38 and 38' which is the same due to the communication of the chambers 38 and 38' through the conduit 58. This secondary pressure is transmitted through the conduit 58, the chamber 77 and the conduit 59 to the rear brakes 44 and 44' which are thus applied. At the same time, the oil driven from the transfer chamber 21 into the conduit 57 passes through the passage 74 and the chamber 77 into the conduit 59 which supplies the rear brakes 46 and 46'. When the pressure in the conduit 57 overcomes the spring 78, the device 60 acts as a pressure booster, which accentuates the braking effect, both at the front and at the rear.

In the case of braking on reverse running, the reactions of the shoes are reversed and are simply absorbed on fixed points. No amplified thrust of the application members 41 and 41' now reaches the secondary pistons 40 and 40' of the front brakes 32 and 32'.

Any movement of the secondary pistons 40 and 40' is prevented in the direction for which the secondary chambers 38 and 38' increase in volume, by virtue of the abutment of the nuts 54 against the shoulders 56. There is an economy of oil in the chambers 38 and 38' which makes it possible to reserve a larger quantity of oil for the supply at 59 of the rear brakes 46 and 46'.

There is obtained a good distribution of the braking effort between the front and the rear: lower effort on the front brakes 32 and 32' and more oil for the application of the rear brakes 46 and 46' under a pressure at 59 which is relatively low at the beginning of the braking operations. The conduit 57 which drives oil into the conduit 59 for supplying the rear brakes 46 and 46' then has the effect, in a second braking phase and by means of the pressure booster 60, of increasing the pressure on the downstream side of the device 60 and especially in the supply conduit 59 for the rear brakes 46 and 46'.

In the alternative form of a wheel cylinder shown in FIG. 4, the arrangement is similar to that which has been described with reference to FIG. 2, but the abutment between the secondary piston 40 and the cylinder, instead of comprising the nut 54 and the shoulder 56, consists of a washer 80 fixed in the cylinder and co-operating with an end bearing surface 81 of the secondary piston 40.

Figure 4:
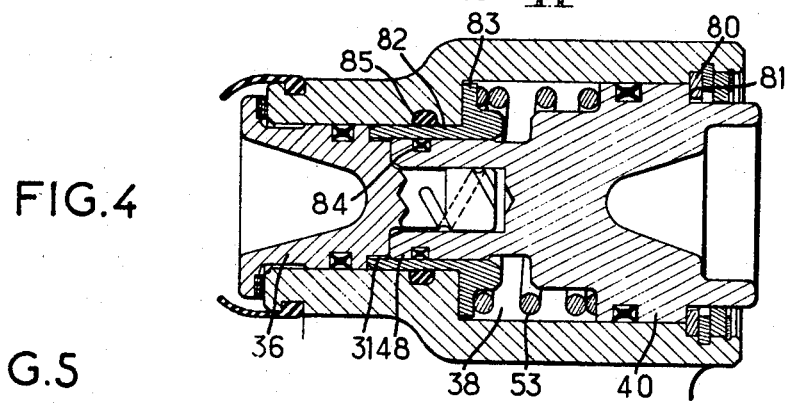
FIGS. 4, 5 and 6 are views in cross-section of three alternative forms of a wheel cylinder, respectively.

In addition, in FIG. 4, a separation ring 82 is interposed between the primary chamber 31 and the secondary chamber 38. The ring 82 surrounds the tail 48 of the secondary piston 40 and is engaged in the primary bore, while a collar 83 on the ring 82 is engaged in the secondary bore. A fluid-tight ring 84 is provided between the ring 82 and the tail 48. A fluid-tight ring 85 is provided between the ring 82 and the primary bore.

Figure 5:
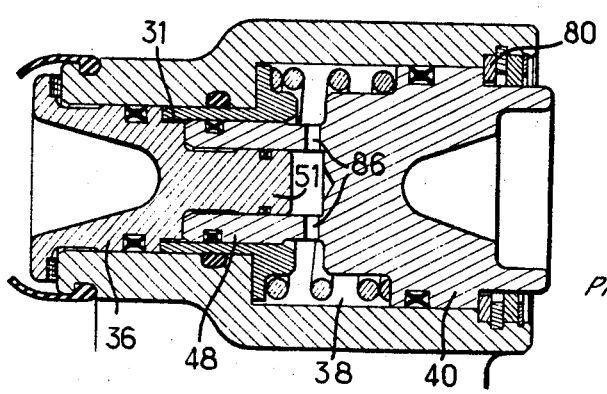

In the alternative form shown in FIG. 5, the arrangement is the same as in FIG. 4, but the tail 51 of the primary piston 31 is subjected to the pressure of the secondary chamber 38 by means of passages 86 formed in the tail 48.

Figure 6:
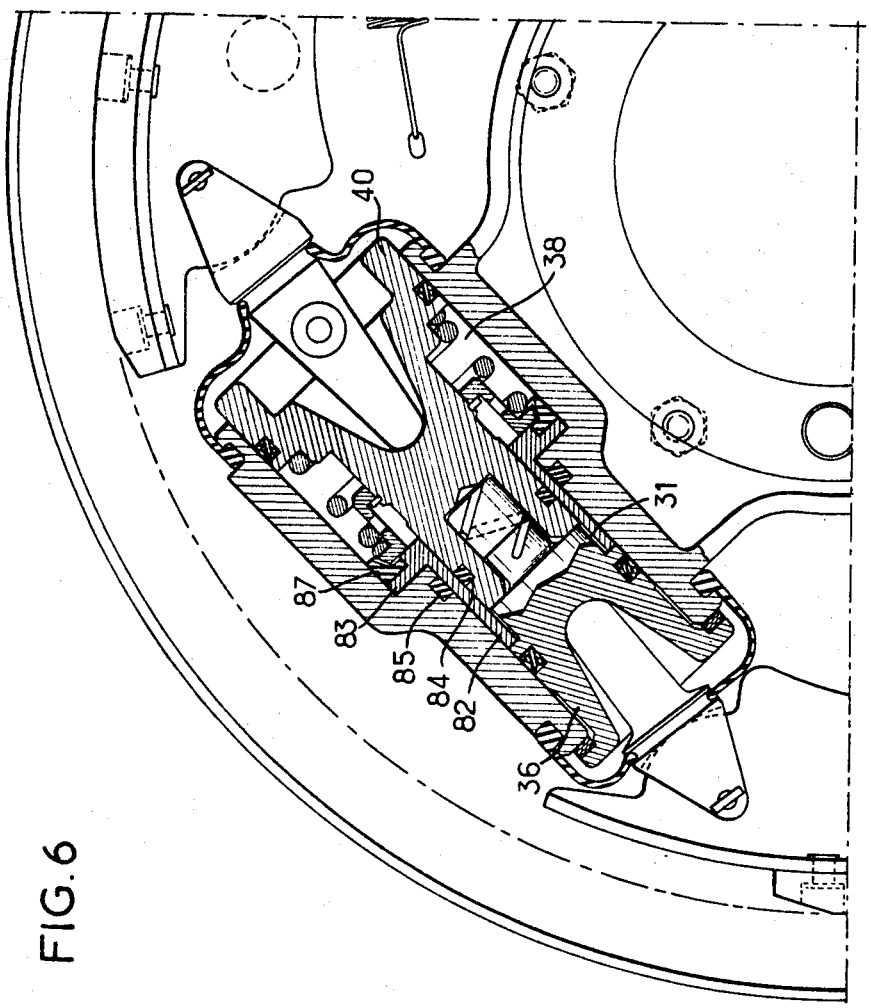

In the wheel cylinder shown in FIG. 6, the collar 83 of the separation ring 82 is provided with a fluid-tight sealing ring 87 co-operating with the secondary bore of the wheel-cylinder. This results in an economy of oil during braking operations in reverse running. It will be noted that the secondary piston retains in this case all its freedom of movement in the direction of passing out of its bore.

Reference will now be made to FIGS. 7 and 8, in which a part 88 of the transfer chamber 21 of the master-cylinder 10 is connected by a conduit 91 to the chambers 44 and 44' of the rear brakes 46 and 46', and is connected at 92 to the secondary chambers 38 and 38' of the front brakes 32 and 32' through the intermediary of a unidirectional clapper valve 93 adapted to be tilted by a collar 94 on a plunger 89. The latter is subjected on one side to the pressure of the chamber 88 and on the other side to the pressure of the chamber 20. A further plunger 90 may also be provided and is subjected on one side to the pressure of the chamber 88 and on the other side to the pressure of the chamber 22.

During a braking operation on forward running, the plunger 89 is pushed back into abutment towards the left of FIG. 7 and rocks the clapper valve 93 which thus becomes partly open. During braking on reverse running, the plunger 89 is permitted to be moved towards the right of FIG. 7 and permits the valve 93 to reclose. The front brakes are no longer supplied from that moment with secondary oil and the rear brakes profit alone from the supply by the reduction in volume of the space 21, 88, taking into account the movement of the master piston 14 and the movement of approach of the plungers 89 and 90 towards each other.

Instead of two plungers 89 and 90, the master cylinder 10 could be provided with one only, serving to actuate the clapper valve 93. Generally speaking, this latter could co-operate with or be wholly or partly constituted by a device responsive to one or more appropriate factors, for example the direction of running during the braking operation.

It will of course be understood that the invention is not limited to the forms of construction described and shown, but includes all the alternative forms. Among others, the pressure booster may be adopted either in combination with the arrangement of FIG. 2 in the manner described, or independently of this arrangement, or in combination with all or part of the other arrangements described or shown, etc.

What I claim is:

1. A hydraulic brake device, especially for automotive vehicles, in which a first axle has two brakes comprising a primary chamber defined at least in part by a primary piston, and a secondary chamber defined at least in part by a secondary piston, said primary and secondary pistons being associated with brake-application members, a master cylinder driving equivalent volumes of fluid, for example equal or proportional volumes, into the primary chambers of the brakes of said first axle, while the secondary chambers of the brakes of said first axle are connected to a secondary circuit which communicates on the one hand with a transfer chamber of said master cylinder and on the other hand with two brakes of a second axle for the application of said brakes, and reinforcement means to reserve a sufficient supply of hydraulic fluid simultaneously for both brakes of said second axle during the course of braking in the direction of running for which the pressure in the secondary chambers of said first axle is not high, said reinforcement means comprising a separation ring which is interposed between the primary chamber and the secondary chamber of a cylinder of each brake of said first axle and which surrounds a tail of the secondary piston while being engaged in the primary bore, while a collar on said ring is engaged in the secondary bore, fluid-tight seals being provided, not only between the ring and the tail of the secondary piston and between the ring and the primary bore, but also between the collar on the ring and the secondary bore.

2. A hydraulic brake device, especially for automotive vehicles, in which a first axle has two brakes each comprising a primary chamber defined at least in part by a primary piston, and a secondary chamber defined at least in part by a secondary piston, said primary and secondary pistons being associated with brake-application members, a master cylinder driving equivalent volumes of fluid, for example equal or proportional volumes, into the primary chambers of the brakes of said first axle, while the secondary chambers of the brakes of said first axle are connected to a secondary circuit which communicates on the one hand with a transfer chamber of said master cylinder and on the other hand with two brakes of a second axle for the application of said brakes, and reinforcement means to reserve a sufficient supply of hydraulic fluid simultaneously for both brakes of said second axle during the course of braking in the direction of running for which the pressure in the secondary chambers of said first axle is not high, said reinforcement means comprising a unidirectional clapper valve, and the transfer chamber of said master cylinder being directly connected to the chambers of the brakes of said second axle and being coupled to the sceondary chambers of the brakes of said first axle through the intermediary of said unidirectional valve which is adapted to cooperate with a device responsive to the direction of running, in such manner that said valve is open for one direction of running and is closed during the course of braking in the other direction of running.

3. A hydraulic brake device as claimed in claim 2, in which said device is responsive to a comparison of the secondary pressure with one or the other or both the primary pressures.

4. A hydraulic brake device as claimed in claim 3, in which said device is adapted to co-operate with a plunger subjected on one side to the secondary pressure and on the other side to at least one of the primary pressures.

5. A hydraulic brake device, especially for automotive vehicles, in which a first axle has a brake having a primary chamber defined at least in part by a primary piston, and a secondary chamber defined at least in part by a secondary piston, said primary and secondary pistons being associated with brake-application members to apply said brake, a master cylinder driving equivalent volumes of fluid, for example equal or proportional volumes, into the primary chamber of the brake of said first axle, while the secondary chamber of the brake of said first axle is connected to a secondary circuit which communicates on the one hand with a transfer chamber of said master cylinder and on the other hand with a brake on a second axle for the application of the last-named brake, and means for augmenting the supply of fluid to the brake of said second axle during the course of braking in the direction of running for which the pressure in said secondary chamber of said first axle is not high, said augmenting means comprising means limiting the volume of said secondary chamber during the course of braking in said direction, said limiting means comprising a separation ring which is interposed between the primary chamber and the secondary chamber of the cylinder of the brake of said first axle and which surrounds the tail of a piston in said secondary chamber while being engaged in the primary bore, while a collar on said ring is engaged in the secondary bore, fluid tight seals being provided, not only between the ring and the tail of the secondary piston and between the ring and the primary bore, but also between the collar on the ring and the secondary bore.

6. A hydraulic brake device, especially for automotive vehicles, in which a first axle has a brake having a primary chamber defined at least in part by a primary piston, and a secondary chamber defined at least in part by a secondary piston, said primary and secondary pistons being associated with brake-application members to apply said brake, a master cylinder driving equivalent volumes of fluid, for example equal or proportional volumes, into the primary chamber of the brake of said first axle, while the secondary chamber of the brake of said first axle is connected to a secondary circuit which communicates on the one hand with a transfer chamber of said master cylinder and on the other hand with a brake on a second axle for the application of the last-named brake, and means for augmenting the supply of fluid to the brake of said second axle during the course of braking in the direction of running for which the pressure in said secondary chamber of said first axle is not high, said augmenting means comprising means limiting the volume of said secondary chamber during the course of braking in said direction, said augmenting means comprising valve means, and the transfer chamber of said master cylinder being directly connected to the brake of said second axle and being coupled to the secondary chamber of the brake of said first axle through the intermediary of said valve means which is adapted to cooperate with a device responsive to the direction of running, in such manner that said valve means is open for one direction of running and is closed during the course of braking in the other direction of running.

References Cited

UNITED STATES PATENTS

| | | | |
|---|---|---|---|
| 2,207,173 | 7/1940 | Geopfrich | 188—152 |
| 3,305,051 | 2/1967 | Maurice | 188—152 |
| 2,351,953 | 6/1944 | Geopfrich | 188—152 XR |

MILTON BUCHLER, *Primary Examiner.*

C. E. HALVOSA, *Assistant Examiner.*